C. C. Foster,

Fertilizer Sower.

No. 95,336. Patented Sep. 28, 1869.

United States Patent Office.

C. C. FOSTER, OF ODESSA, DELAWARE.

Letters Patent No. 95,336, dated September 28, 1869.

IMPROVEMENT IN FERTILIZER-ATTACHMENT.

The Schedule referred to in these Letters Patent and making part of the same.

To all whom it may concern:

Be it known that I, C. C. FOSTER, of Odessa, in the county of New Castle, and in the State of Delaware, have invented certain new and useful Improvements in Fertilizer-Attachment; and do hereby declare that the following is a full, clear, and exact description thereof, reference being had to the accompanying drawings, and to the letters of reference marked thereon, making a part of this specification.

The nature of my invention consists in a new method of regulating the amount of phosphate or other fertilizer sown with a grain-drill, by making the shaft on which the rollers are placed adjustable, so as to be moved any distance desired from the bottom of the fertilizer-attachment.

In order to enable others skilled in the art to which my invention appertains, to make and use the same, I will now proceed to describe its construction and operation, referring to the annexed drawings, in which—

Figure 1:
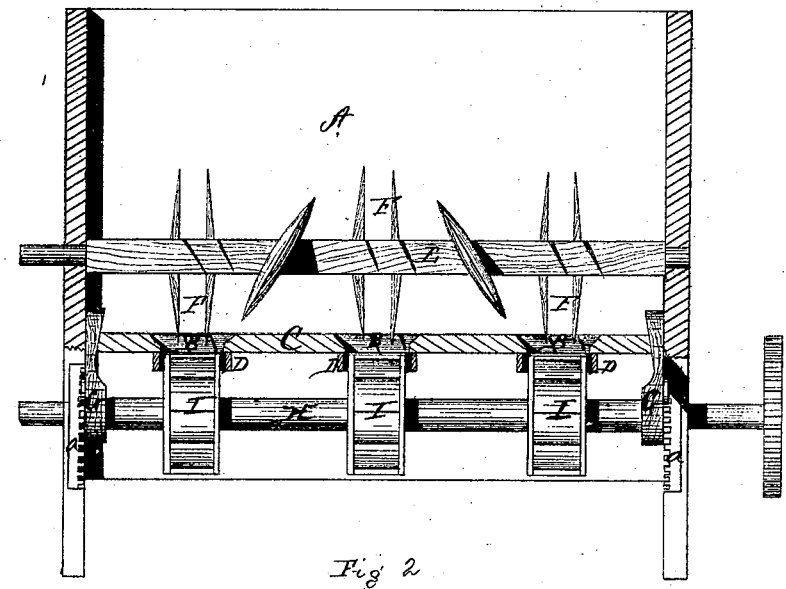
Figure 2:
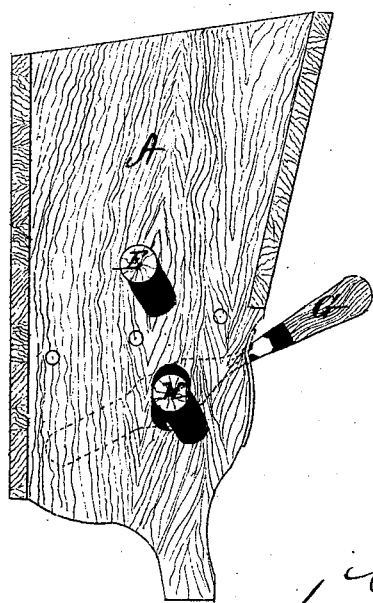

Figure 1 is a longitudinal vertical section, and
Figure 2 is an end view.

A represents the frame-work, or box, of my phosphate-attachment. It is a light wooden or metallic box, made somewhat in the shape of a hopper, and is attached to the hopper of any grain-drill, by screws, or other suitable means.

A series of rectangular holes, B B, with bevelled sides, is cut through the bottom C, and on the under side of said bottom, surrounding the holes B B, are placed saddles D D.

The bottom C and saddles D D, I prefer to cast in one piece, although, if desired, the saddles may be separate and attached to the bottom by any suitable means.

Inside of the box A, and near and parallel to its bottom, is placed a shaft, E, having a series of agitators, F, of any suitable construction, to stir up the phosphate.

The sides and front of the box A extend below the bottom C, and on the inner sides of the side, near the front, are pivoted two levers, G G, in which a shaft, H, has its bearings, said shaft running parallel with the bottom, and its ends extending through elongated slots in the sides of the box.

On the shaft H is placed a series of rollers, I I, one under each of the saddles D D.

These rollers, which may be made of any material desired, are all equal in size, and must be made so that in their periphery a number of recesses is cut, so as to leave between each two recesses a cutting or sharp edge.

On the rear edges of the sides of the box A are placed ratchets a a, in which small projections or pawls on the levers G G fit, so that said levers may be raised or lowered at pleasure, and held in any position desired, by which means more or less of the phosphate is allowed to pass out.

Scraping-springs may also be attached to the box A, for the purpose of keeping the rollers constantly clean, and prevent the phosphate, if wet, from clogging there and filling up the recesses.

The shafts E and H may be driven by suitable gearing, connected with the grain-drill.

Having thus fully described my invention,
What I claim as new, and desire to secure by Letters Patent, is—

The arrangement, upon an adjustable shaft under the bottom of the hopper of a fertilizer-attachment, of one or a series of rollers of any suitable shape and material, substantially as and for the purposes herein set forth.

In testimony that I claim the foregoing, I have hereunto set my hand, this 7th day of August, 1869.

C. C. FOSTER.

Witnesses:
WILLIAM T. CHANCE,
DAVID S. MORGAN.